United States Patent Office

3,663,497
Patented May 16, 1972

3,663,497
FRICTION MATERIAL
Kiyosha Ninomiya and Hideaki Ohara, Nagoya-shi, Japan, assignors to Kabushiki Kaisha Toyota Chuo Kenkyusho, Nagoya-shi, Aichi-ken, Japan
Continuation-in-part of application Ser. No. 723,350, Apr. 19, 1968. This application Sept. 16, 1970, Ser. No. 72,698
Claims priority, application Japan, Apr. 28, 1967, 42/27,651
Int. Cl. C08g 51/12
U.S. Cl. 260—38
4 Claims

ABSTRACT OF THE DISCLOSURE

An improved friction material for friction-engaging mechanisms, such as automotive brakes and clutches, comprising about 30 to 80% of iron oxide powder whose main ingredient is ferrosoferric oxide, such as iron sand, about 15 to 65% of organic binder, and the balance of fillers and additives, whereby to improve wear, reduce defacement and provide a substantially constant coefficient of friction.

---

This application is a continuation-in-part of applicants' previously filed application Ser. No. 723,350, filed Apr. 19, 1968, and entitled "Friction Material," now abandoned.

This invention relates to an improved friction material for friction-engaging mechanisms, and more particularly to a molded friction lining material for automotive brakes and clutches, and the like.

The optimum properties of a good friction material for automotive brake linings and the like are: an adequate coefficient of friction for the expected usage, the ability to retain a substantially constant coefficient of friction under varying conditions such as rubbing surface temperature, rubbing surface pressure, and rubbing surface sliding speed, little wear on the rubbing surface, and little wear or scoring on an opposed rubbing surface.

Conventional friction materials, most of which are molded of a mixture mainly composed of asbestos fibers and including an organic binder, such as phenol resin, together with fillers and additives, have not been adequate to provide optimum properties as listed above.

Conventionally, friction materials molded of a mixture mainly composed of metallic material, such as cast iron, have also been used, but it is well-known that these are not suitable for automotive brake lining materials because of their great expense (being serveral times as expensive as those mainly composed of asbestos) and because of great wear and scoring produced thereby on the opposed rubbing surfaces, and consequently they have been mainly used for heavy railway equipment.

It is a primary object of the present invention to provide an improved friction material, and particularly an automotive brake lining material, having the above-listed optimum properties and which obviates the defects in these respects of conventional friction materials.

A further important object of the invention is to provide an improved friction material which evidences less wear and scoring than conventional friction materials under similar conditions of usage.

Another object of the invention is to provide a friction material which maintains a substantially constant coefficient of friction over a wide range of temperatures at its rubbing surface.

Still another object of the invention is to provide a friction material which can be simply produced and which is economical to fabricate and use.

The novel features that are considered characteristic of the invention are set forth with particularity in the appended claims. The invention, itself, both as to its organization and its method of operation, together with additional objects and advantages thereof, will best be understood from the following description of specific embodiments when read in connection with the accompanying drawings, wherein like reference characters indicate like parts throughout the several figures, and in which:

Figure 3:
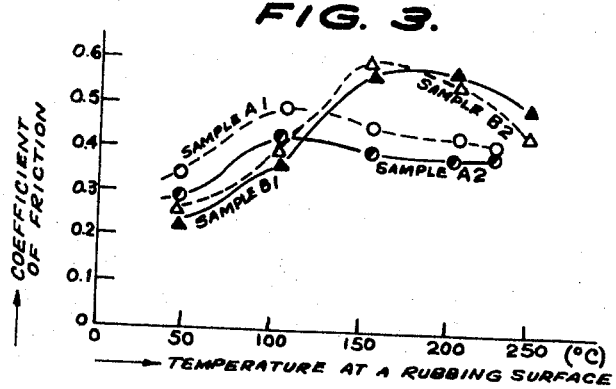
Figure 4A:
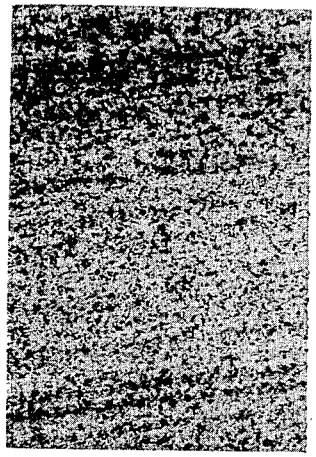
Figure 4B:
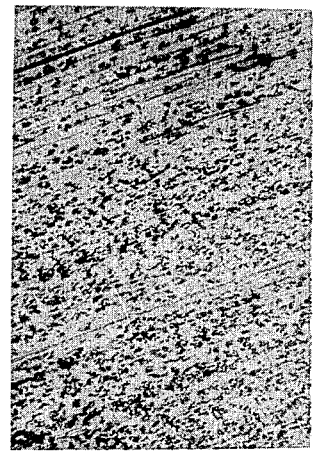
Figure 4C:
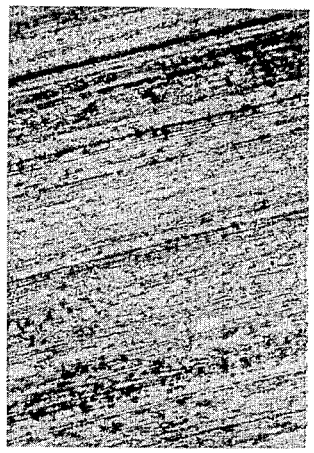
Figure 4D:
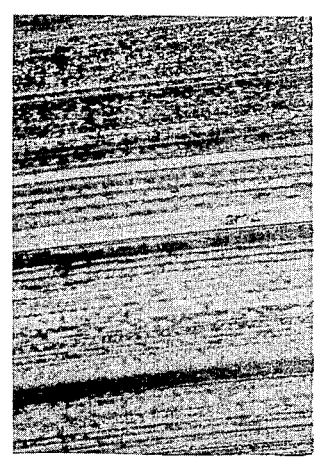

FIG. 3 is a diagram showing the relation between the temperature at the rubbing surface and the coefficient of friction of friction materials according to the present invention, and conventional materials; and FIGS. 4(a) to (d) are microphotographs showing wear and scoring appearing on the rubbing surface of a disc, when the disc is rubbed by the friction material according to the present invention (FIGS. 4(a) and (b)) and by a conventional friction material (FIGS. 4(c) and (d)).

The novel feature which is considered characteristic of the present invention is that iron oxide powder, whose main ingredient is ferrosoferric oxide, such as iron sand, is included as the main ingredient of the friction material, instead of asbestos fibers which have been used conventionally.

The friction material, according to the present invention, contains iron oxide powder, mainly composed of ferrosoferric oxide, such as iron sand 30–80% by weight, organic binder 15–65%, and the balance of (friction modifying) fillers and agents (additives) and is heated and molded by a conventional method. It has improved properties, such as less wear on its rubbing surface, constant coefficient of friction, and less wear and scoring on the opposite rubbing surface, and is particularly suitable for automotive brake linings.

As a result of using iron sand, and the like, as the main ingredient, the total cost of material production is lowest because naturally produced iron sand can be obtained for a few percent of the most of asbestos fibers.

Detailed ingredients of the mixture comprising the friction material of the present invention are described below.

For iron oxide powder mainly composed of ferrosoferric oxide, iron sand, which is naturally produced as magnetite powder, is used.

For organic binder, one or more kinds of conventional binders, such as phenol resin and modified phenol resins are used in the mixture.

For the fillers, one or more kinds of conventional fillers, such as barite, graphite, litharge and kaolin are used in the mixture. Asbestos fibers are added in the present invention as one of the fillers, said fibers being effective in the molding process to maintain uniformity of mixture of the ingredients, and they contribute to improved quality of the product because of their fibrous characteristics.

For additives, one or more kinds of conventional additives, such as lead dioxide and manganese dioxide are used in the mixture.

The inventors have studied the plastic flow of ferrosoferric oxide ($Fe_3O_4$) applied on a rubbing surface which occurs due to the frictional heat developed thereon. Tests were carried out using friction materials with various contents of iron sand, which is well-known as iron oxide powder whose main ingredient is ferrosoferric oxide.

The inventors have used three kinds of iron sand (A, B, C) which were produced as magnetic powder in three different places in Japan, and whose ingredients are shown in Table 1. As will be apparent from this table, their main ingredients are ferrosoferric oxide.

TABLE 1

| Ingredients | $Fe_3O_4$ | $TiO_2$ | $SiO_2$ | $Al_2O_3$ | percent |
|---|---|---|---|---|---|
| Iron sand: | | | | | |
| A | 84.4 | 9.7 | 2.2 | 2.5 | 1.3 |
| B | 81.2 | 11.7 | 2.8 | 2.5 | 1.8 |
| C | 79.9 | 13.4 | 2.6 | 2.0 | 2.1 |

Samples to be tested were manufactured by a conventional molding process as follows: a powder mixture of the three kinds of iron sand listed above was passed through a No. 80 mesh sieve, and the resultant powder, uniformly mixed with phenol-formaldehyde resin at a ratio shown in Table 2, was molded at a temperature of 170° C. under a pressure of 180 kg./cm.$^2$ in a metal mold. Samples Nos. 1 to 7 in the following table were thus obtained:

TABLE 2

| Sample No | 1 | 2 | 3 | 4 | 5 | 6 | 7 |
|---|---|---|---|---|---|---|---|
| Ingredient: | | | | | | | |
| Iron sand, percent | 80 | 70 | 60 | 50 | 40 | 30 | 10 |
| Resin, percent | 20 | 30 | 40 | 50 | 60 | 70 | 90 |

The wear of Samples numbered 1 to 7 in the above table was measured substantially in accordance with the testing method described by Japanese Industrial Standard D4411. That is, each sample was kept in frictional contact with a rotating disc made of steel (Japanese Industrial Standard—S45C) for ten minutes under a normal load of 5.0 kg./cm.$^2$ at a sliding speed on the rubbing surface of 4.1 m./sec. while the temperature of the friction surface was kept at 100° C. constantly, by cooling.

Figure 1:
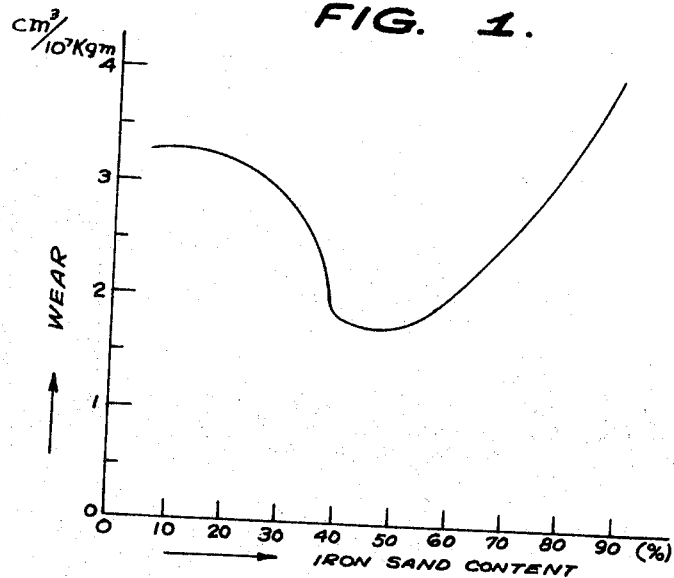
FIG. 1 is diagram showing the relation between iron sand content and wear of friction materials with varying iron sand content.

The relationship between iron sand content and wear obtained by the above tests are shown by the curve of FIG. 1, wherein the abscissa shows the iron sand content and the ordinates show the amount of wear. It will be observed that the wear gradually decreases up to about 40% of iron sand content and increases again above 50% of iron sand content. In other words, wear becomes minimum at about 40–50% of iron sand content.

The samples numbered 1 to 7 were then tested to measure coefficients of friction with various rubbing surface temperatures according to the same method as described above except that the friction surface of each sample was not cooled, but the temperature thereof was allowed to vary between room temperature and 250° C. at its maximum. The results obtained are shown in Table 3, below:

TABLE 3

| Sample | Iron sand content, percent | Degrees centigrade | | | | | Difference of maximum and minimum values |
|---|---|---|---|---|---|---|---|
| | | 50 | 100 | 150 | 200 | 250 | |
| Number: | | | | | | | |
| 1 | 80 | 0.46 | 0.49 | 0.57 | 0.60 | 0.52 | 0.14 |
| 2 | 70 | 0.44 | 0.48 | 0.56 | 0.59 | 0.52 | 0.15 |
| 3 | 60 | 0.42 | 0.49 | 0.56 | 0.59 | 0.47 | 0.17 |
| 4 | 50 | 0.43 | 0.48 | 0.54 | 0.58 | 0.41 | 0.17 |
| 5 | 40 | 0.43 | 0.48 | 0.53 | 0.57 | 0.38 | 0.19 |
| 6 | 30 | 0.42 | 0.46 | 0.53 | 0.57 | 0.29 | 0.28 |
| 7 | 10 | 0.42 | 0.47 | 0.53 | 0.55 | 0.08 | 0.47 |

Figure 2:
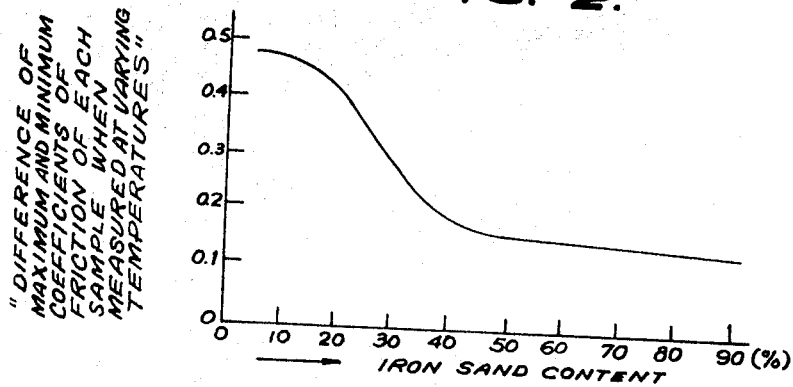
FIG. 2 is a diagram showing the relation between iron sand content and difference of maximum and minimum values of coefficient of friction of each sample, varied with temperature change.

In the right-hand end column of Table 3 is shown the difference of maximum and minimum values of coefficient of friction of each sample over the range of temperature at the rubbing surface, as a means for showing the degree of the variation of the coefficient of friction with the increase of temperature. The relation between the iron sand content and the said difference between maximum and minimum values of coefficient of friction is shown in FIG. 2, the former being plotted as abscissa against the latter as ordinates.

As is apparent from Table 3 and FIG. 2, the variation of the coefficient of friction due to the temperature change becomes great at about 30% and below of iron sand content, and at more than 40% of iron sand content said variation becomes further smaller and substantially constant.

By another test described later (using Samples $B_1$ and $B_2$ presently to be described), most conventional molded friction materials whose main ingredients were asbestos fibers showed wear of more than 3.4–3.5 cm.$^3$/10$^7$ kgm., as compared to less than 2 cm.$^3$/10$^7$ kgm., for the material of the invention with 40–50% iron sand content. It is apparent from the test results shown in FIGS. 1 and 2 and in comparison with the wear amount of conventional friction materials that the amount of iron oxide powder, whose main ingredient is ferrosoferric oxide, such as iron sand, may be set at a practically effective range of 30–80% to exhibit the improved wear resistance which is one of the benefits and a characteristic feature of the present invention.

In conventional friction materials, a preparation of 10% of organic binder has been sufficient to mold the product, but in the present invention, more than 15% is required to retain the improved wear resistance above-described. The upper limit of organic binder content was determined to be 65%, because when the iron sand content was at a minimum (30%) at least 5% of fillers and additives were required in order for the material to exhibit the improved characteristics.

A pair of practical Samples $A_1$ and $A_2$, which are usable for automotive brake lining, were manufactured containing proper amounts of ingredients according to the present invention, in which iron sands were contained in the most desirable amount, as follows:

| | Ingredients | | Amount by weight, percent |
|---|---|---|---|
| Sample $A_1$: | Main ingredient organic binder fillers. | Iron sand | 50 |
| | | Phenol resin | 24 |
| | | Asbestos fibers | 10 |
| | | Barium sulfate | 8 |
| | | Polymer made of cashew nut shell oil. | 6 |
| Do | Additive | Lead dioxide | 2 |
| Sample $A_2$: | Main ingredient organic binder fillers. | Iron sand | 40 |
| | | Phenol resin | 24 |
| | | Asbestos fibers | 20 |
| | | Graphite | 8 |
| | | Polymer made of cashew nut shell oil. | 6 |
| Do | Additive | Manganese dioxide | 2 |

The above samples were manufactured by a conventional molding process, using a mixture of the three kinds of iron sand shown in Table 1 and passed through a No. 80 mesh sieve, mixed uniformly with the other ingredients listed above. The mixtures were molded at a temperature of 170° C. under a pressure of 180 kg./cm.$^2$ in a metal mold.

Conventional friction materials $B_1$ and $B_2$ were prepared, to be compared with Samples $A_1$ and $A_2$. Sample $B_1$ is a commercially available friction material for automotive brake lining, "Akebono FTJ," made by Akebono Brake Kogyo Kabushiki Kaisha, Hanyu, Saitama-ken, Japan, whose main ingredient is asbestos fibers and which contains other ingredients such as binders and fillers wherein the proportions are not publicly known. Sample $B_2$ was specially molded by the same process as used to make Samples $A_1$ and $A_2$, its ingredients and their amounts being as listed below:

| | Ingredients | | Amount by weight, percent |
|---|---|---|---|
| Sample $B_2$: | Main ingredient binder fillers. | Asbestos fibers | 50 |
| | | Phenol resin | 24 |
| | | Iron sand | 10 |
| | | Barium sulfate | 8 |
| | | Polymer made of cashew nut shell oil. | 6 |
| Do | Additive | Lead dioxide | 2 |

These Samples $A_1$, $A_2$, $B_1$ and $B_2$ were tested substantially according to the testing method for automotive brake lining set by the Japanese Industrial Standard D4411, under the same testing conditions as in the cases of the above-mentioned samples numbered 1 to 7. The test results, described below, clearly show the excellent characteristics achieved by the friction material of the present invention.

The test results are as follows:

(1) The wear of Samples $A_1$ and $A_2$ was about half of that of Samples $B_1$ and $B_2$, as in the following listing:

| Sample: | Wear (cm.$^3$/10$^7$ kgm.) |
| --- | --- |
| $A_1$ | 1.8 |
| $A_2$ | 1.9 |
| $B_1$ | 3.5 |
| $B_2$ | 3.4 |

(2) The variation of the coefficient of friction with increase in temperature at the rubbing surface was very small and the coefficient remained practically constant above 100° C. for Samples $A_1$ and $A_2$, as compared with Samples $B_1$ and $B_2$, as shown in Table 4, below:

TABLE 4

| | Rubbing surface temperature, °C. | | | | | Difference of maximum and minimum values |
| --- | --- | --- | --- | --- | --- | --- |
| | 50 | 100 | 150 | 200 | 225 | 250 | |
| Sample: | | | | | | | |
| $A_1$ | 0.35 | 0.50 | 0.45 | 0.44 | 0.41 | | 0.15 |
| $A_2$ | 0.30 | 0.45 | 0.40 | 0.38 | 0.40 | | 0.15 |
| $B_1$ | 0.23 | 0.36 | 0.56 | 0.58 | | 0.51 | 0.35 |
| $B_2$ | 0.25 | 0.38 | 0.60 | 0.55 | | 0.45 | 0.35 |

In FIG. 3, the abscissa shows the temperature at the rubbing surface and the ordinates show coefficient of friction. The coefficient of friction of Samples $B_1$ and $B_2$ increased with temperature at the rubbing surface until they reached about 200° C. and then decreased with further rise in temperature. In contrast, the coefficients of friction of Samples $A_1$ and $A_2$ were substantially constant over the range of temperature above 100° C.

The stability of coefficients of friction of Samples $A_1$ and $A_2$ with the increase of temperature of the rubbing surface is also apparent from the right-hand end column of FIG. 4, which shows the difference value between maximum and minimum coefficients of friction of each sample in the range of the rubbing surface temperature. Samples $A_1$ and $A_2$, according to the present invention, exhibited a small difference value of 0.15, while Samples $B_1$ and $B_2$, representing conventional materials, exhibited a relatively large difference value of 0.35.

(3) The wear and scoring on the disc (the opposed rubbing surface) were extremely small for Samples $A_1$ and $A_2$ as compared with Samples $B_1$ and $B_2$. The wear and scoring may be observed on the microphotographs, shown as FIGS. 4(a)-(d), enlarged about 25×2.4 times. Only very indistinct streaks were observed on the disc when it was rubbed by Samples $A_1$ and $A_2$, as shown in FIGS. 4(a), and (b), while clear streaks were observed when the disc was rubbed by Samples $B_1$ and $B_2$, as shown in FIGS. 4(c) and (d).

Thus, it is apparent that friction material according to the present invention has a characteristic feature in that it produces less wear and less scoring on an opposed rubbing surface than previously known materials. The inventors believe that this effect is due to the plastic flow of ferrosoferric oxide, which is the main ingredient of iron sand, such plastic flow not being expected from iron oxide whose main ingredient is not ferrosoferric oxide, or from cast iron. It is believed that this effect can be obtained only by friction materials such as those of the present invention, including substantial amounts of ferrosoferric oxide.

In the case of automotive brakes, a drum in a brake disc or a disc in a disc brake, employed as the opposed surface engaged by a brake lining, is not replaced by a new one periodically as is done in the case of wheels for railway cars. It is, therefore, necessary to minimize wear and scoring of such opposing surfaces due to friction with the brake lining in the case of automotive brakes as much as possible so that the drum, disc, or corresponding opposing surface can survive long periods of use. At the same time, it is necessary to maintain a sufficient coefficient of friction to provide adequate braking.

Friction material according to the present invention fulfills these strict requirements. As is apparent from the above-mentioned test results, the novel characteristics of the invention are as follows: the wear is extremely small; the coefficient of friction changes very little and remains nearly constant with increase of temperature at the rubbing surface; wear and scoring on the opposed rubbing surface are low; and manufacture is economical. For these reasons, friction materials according to the present invention are especially useful for automotive brake lining materials.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. A brake lining material having a substantially constant coefficient of friction and relatively low abrasive properties comprising by weight 30–80% iron oxide powder whose main ingredient is ferrosoferric oxide, such as iron sand, organic binder 15–65%, and the balance of fillers and additives.

2. A friction material according to claim 1, wherein the proportion of iron sand ranges between 40–50%.

3. A friction material according to claim 1, comprising 50% iron sand, 24% phenol resin, 10% asbestos fibers, 8% barium sulfate, 6% polymer of cashew nut shell oil, and 2% lead dioxide.

4. A friction material according to claim 1, comprising 40% iron sand, 24% phenol resin, 20% asbestos fibers, 8% graphite, 6% polymer of cashew nut shell oil, and 2% manganese dioxide.

References Cited

UNITED STATES PATENTS 3,092,595  6/1963  Smith et al. _____ 260—38 X
3,434,998  3/1969  Aldrich et al. _____ 260—38

OTHER REFERENCES

Rose et al.: The Condensed Chemical Dictionary, 5th ed., Reinhold Publ. Corp., New York, 1956, p. 602.

MORRIS LIEBMAN, Primary Examiner

S. M. PERSON, Assistant Examiner

U.S. Cl. X.R.

106—36; 260—DIG 39